| United States Patent [19] | [11] Patent Number: 4,539,352 |
|---|---|
| Chung et al. | [45] Date of Patent: Sep. 3, 1985 |

[54] INJECTION-MOLDABLE THERMOPLASTIC POLYESTER COMPOSITION

[75] Inventors: James Y. J. Chung, New Martinsville, W. Va.; Jesse D. Jones; Hsueh M. Li, both of Baton Rouge, La.

[73] Assignee: Ethyl Corporation, Richmond, Va.

[21] Appl. No.: 640,872

[22] Filed: Aug. 15, 1984

Related U.S. Application Data

[60] Division of Ser. No. 513,677, Jul. 14, 1983, Pat. No. 4,486,561, Continuation-in-part of Ser. No. 294,980, Aug. 21, 1981, abandoned, and Ser. No. 392,221, Jun. 25, 1982, abandoned, and Ser. No. 401,929, Jul. 26, 1982, abandoned.

[51] Int. Cl.$^3$ .......................... C08K 5/15; C08L 67/02
[52] U.S. Cl. .......................... 524/109; 260/DIG. 35; 524/107; 524/114; 524/300; 524/291; 524/394; 524/399; 524/404; 524/605
[58] Field of Search ............... 260/DIG. 35; 524/107, 524/109, 114, 300, 394, 399, 291, 404, 605

[56] References Cited

U.S. PATENT DOCUMENTS

| 3,516,957 | 6/1970 | Gray et al. | 524/605 |
|---|---|---|---|
| 3,553,157 | 1/1971 | Goodman et al. | 523/444 |
| 3,575,931 | 4/1971 | Sherman | 524/605 |
| 3,595,818 | 7/1971 | Weissermel et al. | 524/114 |
| 3,619,266 | 11/1971 | Weissermel et al. | 524/114 |
| 3,663,512 | 5/1972 | Uebe | 524/605 |
| 3,886,104 | 5/1975 | Borman et al. | 524/114 |
| 4,034,013 | 7/1977 | Lane | 524/513 |
| 4,065,438 | 12/1977 | Verborgt | 528/296 |
| 4,172,859 | 10/1979 | Epstein | 525/109 |
| 4,176,224 | 11/1979 | Bier et al. | 528/309 |
| 4,195,134 | 3/1980 | Coleman | 525/65 |
| 4,212,791 | 7/1980 | Avery et al. | 524/107 |
| 4,215,032 | 7/1980 | Kobayashi et al. | 524/114 |
| 4,222,928 | 9/1980 | Kawamura et al. | 260/DIG. 35 |
| 4,229,553 | 10/1980 | Sterzel et al. | 524/109 |
| 4,246,378 | 1/1981 | Kometani et al. | 524/114 |
| 4,276,208 | 6/1981 | Ogawa et al. | 260/DIG. 35 |
| 4,284,540 | 8/1981 | Iida et al. | 524/109 |
| 4,310,658 | 1/1982 | Lazarus et al. | 524/114 |
| 4,327,007 | 4/1982 | Vanderkool et al. | 524/394 |
| 4,351,751 | 9/1982 | Hoeschele | 524/169 |
| 4,351,757 | 9/1982 | Kishida et al. | 524/605 |
| 4,352,904 | 10/1982 | Deyrup | 524/292 |
| 4,357,268 | 11/1982 | Vanderkool et al. | 524/285 |
| 4,368,286 | 1/1983 | Hayashi et al. | 524/394 |
| 4,385,144 | 5/1983 | Jones et al. | 524/114 |

FOREIGN PATENT DOCUMENTS

| 17942 | 10/1980 | European Pat. Off. |
|---|---|---|
| 2129162 | 10/1972 | France |
| 54-95654 | 7/1979 | Japan |
| 54-148833 | 11/1979 | Japan |
| 55-5972 | 1/1980 | Japan |
| 1239455 | 7/1971 | United Kingdom |
| 1282679 | 7/1972 | United Kingdom |
| 1321129 | 6/1973 | United Kingdom |
| 2015013 | 9/1979 | United Kingdom |
| 2015014 | 9/1979 | United Kingdom |

OTHER PUBLICATIONS

Ibbotson and Sheldon, "Heterogeneous Crystallization of Polyethylene Terephthalate", British Polymer Journal, vol. 11, No. 3, Sep. 1979, pp. 146-150.

*Primary Examiner*—Ronald W. Griffin
*Attorney, Agent, or Firm*—Donald L. Johnson; John F. Sieberth; E. Donald Mays

[57] ABSTRACT

Improved injection moldability of polyethylene terephthalates is achieved by the addition of an epoxidized plasticizer and a nucleating agent cooperative with the epoxidized plasticizer to achieve the improved moldability even when the composition is injection molded using mold temperatures of at least as low as 93° C.

8 Claims, 1 Drawing Figure

INJECTION-MOLDABLE THERMOPLASTIC POLYESTER COMPOSITION

REFERENCE TO RELATED APPLICATIONS

This application is a division of application Ser. No. 513,677, filed July 14, 1983, "Now U.S. Pat. No. 4,486,561, issued Dec. 4, 1984", which in turn is a continuation-in-part of application Ser. No. 294,980, filed Aug. 21, 1981, now abandoned, and of application Ser. No. 392,221, filed June 25, 1982, now abandoned, and of application Ser. No. 401,929, filed July 26, 1982, now abandoned.

TECHNICAL FIELD

This invention relates to thermoplastic polyester compositions which are especially useful for injection molding operations conducted at relatively low mold temperatures.

BACKGROUND

It has long been known that polyethylene terephthalate (PET) has superior physical properties, e.g., resistance to chemical attack, and desirable mechanical and electrical properties. Despite these superior physical properties, PET is not always the material of choice for injection molding usage because relatively high mold temperatures, e.g., 120°-140° C., must be utilized to insure good moldability. Any attempt to use a lower mold temperature, e.g., 100° C. or lower, results in the injected material being unmoldable as, for one thing, the molded article sticks in the mold and often can only be removed with great difficulty. To circumvent this processing disadvantage, the molder is forced to select more expensive materials such as polybutylene terephthalate (PBT), inasmuch as this poly(alkylene terephthalate) is easily moldable even when using mold temperatures as low as 60° C. By being able to use a lower mold temperature for PBT, the time necessary for cooling the injection molded article to a temperature at which it can be removed from the mold is considerably shorter than the cooling time necessary before the PET article can be removed from an initially hotter mold. Since this shorter cool-down period of PBT results in a shorter process cycle time and a higher rate of article production, economic justification exists for its use despite its higher unit cost.

Numerous nucleating agents for use in PET compositions are recognized in the art. For example, the following nucleating agents are known: salts of montan wax or of esters of montan wax in which the cation is metals of main groups I-III of the Periodic System (see U.S. Pat. No. 3,619,166); alkaline earth metal carbonates, e.g., calcium magnesium carbonate [CaMg(CO$_3$)$_2$] (see U.S. Pat. No. 3,619,266 and British Pat. No. 1,239,455); oxides, e.g. titanium oxide, aluminum oxide, magnesium oxide, zinc oxide, antimony trioxide and titanium dioxide (see U.S. Pat. No. 3,616,266, British Pat. No. 1,104,089, British Pat. No. 1,111,012, British Pat. No. 1,196,290, British Pat. No. 1,239,455, British Pat. No. 1,246,770 and translation of German Pat. No. 2,014,770); silicates, e.g. talc, sodium-aluminum silicate, CaSiO$_3$, MgSiO$_3$ (see U.S. Pat. No. 3,616,266 and British Pat. No. 1,111,012); lithium or sodium salts of polycarboxylic acids, e.g., succinic acid, adipic acid, suberic acid, 1,10-decanedicarboxylic acid, 1,4-cyclohexanedicarboxylic acid, terephthalic acid, 1,2,3-propanetricarboxylic acid, 1,3,5-cyclohexanetricarboxylic acid, trimellitic acid, 1,2,3,4-cyclopentanetetracarboxylic acid and pyromellitic acid (see U.S. Pat. No. 3,761,450 and translation of German Pat. No. 2,014,770); carbon, e.g., graphite and carbon black (see British Pat. No. 1,104,089, British Pat. No. 1,111,012 and British Pat. No. 1,196,290); salts of alkaline earth metals, e.g., calcium carbonate and calcium sulphate (see British Pat. No. 1,104,089, British Pat. No. 1,196,290 and British Pat. No. 1,246,770); metals in a finely divided state, e.g., copper and antimony (see British Pat. No. 1,104,089 and British Pat. No. 1,196,290); sulphates, e.g., CaSO$_4$, BaSO$_4$ and calcined gypsum (see British Pat. No. 1,111,012, British Pat. No. 1,196,290 and translation of German Pat. No. 2,014,770); glass powder (see British Pat. No. 1,104,089 and British Pat. No. 1,196,290); phosphates, e.g., Ca$_3$(PO$_4$)$_2$ (see British Pat. No 1,111,012 and translation of German Pat. No. 2,014,770); oxalates, e.g., calcium oxalate (see British Pat. No. 1,111,012); stearates, e.g., magnesium stearate (see British Pat. No. 1,111,012 and British Pat. No. 1,181,679); benzoates, e.g., calcium benzoate and potassium benzoate (British Pat. No. 1,111,012 and translation of German Pat. No. 2,014,770); salicylates, e.g., zinc salicylate (see Brtitish Pat. No. 1,111,012 and translation of German Pat. No. 2,014,770); tartrates, e.g., calcium tartrate (British Pat. No. 1,111,012 and translation of German Pat. No. 2,014,770); neutral clays, e.g., "HITDRON" (British Pat. No. 1,111,012 and translation of German Pat. No. 2,014,770); sodium, lithium or barium salts of monocarboxylic acids, e.g., formic acid, acetic acid, propionic acid, butyric acid, isobutyric acid, caprylic acid, stearic acid, cyclohexane carboxylic acid, benzoic acid, p-tert-butyl benzoic acid, and naphthalene-1-carboxylic acid (see British Pat. No. 1,282,679); the disclosure of the foregoing references are incorporated herein by reference.

A welcome contribution to the art would be a PET composition which can be injection molded at relatively low mold temperatures (e.g., 100° C. and below) to yield articles exhibiting good moldability characteristics, e.g., good mold releasability and desirable physical properties.

THE INVENTION

In accordance with this invention there is provided a thermoplastic injection moldable composition which comprises an intimate admixture of:
 (a) a polyethylene terephthalate; and
 (b) an epoxidized plasticizer; and
 (c) an adjuvant cooperative with the epoxidized plasticizer of (b) to improve the releasability from the mold, of articles injection molded from the composition at mold temperatures of at least as low as 93° C.

Because of this cooperation between the components (b) and (c) above, the compositions may be molded at relatively low mold temperatures (e.g., about 50° C. to about 100° C.) without excessive sticking being encountered.

It will be understood, of course, that if desired the composition of this invention may be injected molded at even higher mold temperatures (e.g., about 100° to about 150° C.).

A further aspect of this invention is that the composition may additionally contain reinforcing amounts of a reinforcing filler, e.g., glass fibers either alone or in combination with particulate mineral fillers. Other additives may also be used in the composition such as flame retardants, impact modifiers, and the like.

The polyethylene terephthalate used herein is preferably homopolymeric PET although crystallizable PET copolymers may also be used. Exemplary of useful PET copolymers are those copolymers in which the copolymer contains at least 80 mol percent of repeating units derived from terephthalic acid and ethylene glycol with the remainder (20 mol percent or less) being derived from other well known acid and/or glycol components. Representative acid components are phthalic acid, isophthalic acid, naphthalene 1,4- or 2,6-dicarboxylic acid, diphenyl-4,4'-dicarboxylic acid, diphenyl ether-4,4'-dicarboxylic acid, adipic acid, sebacic acid as well as their halogented (preferably brominated) counterparts. The glycol components may be diethylene glycol, neopentyl glycol, cyclohexanedimethanol, 2,2-bis(4-hydroxyphenyl) propane, 1,3-propanediol, 1,4-butanediol, dibromoneopentyl glycol, the bis(2-hydroxyethyl) ether of tetrabromobisphenol A, tetrabromopxylylene glycol and the like.

The polyethylene terephthalates used herein can be virgin PET or reclaimed PET. Also the PET used in the compositions of this invention should be injection moldable and thus generally can have an intrinsic viscosity (I.V.) as low as 0.3 and preferably between about 0.4 and 1.2, more preferably between about 0.5 and 1.0, as measured at 25° C. in a solvent consisting of 60 percent by weight phenol and 40 percent by weight of tetrachloroethane. For most injection molding applications polyethylene terephthalates in which the I.V. is in the range of 0.4 to 0.9 are most preferred.

The compositions of this invention preferably have an amount of the herein described epoxidized plasticizer (also sometimes referred to in the art as an "epoxy plasticizer") within the range of from about 0.5 to about 12 parts per hundred parts of PET (i.e., from about 0.5 to about 12 phr) and an amount of adjuvant within the range of from about 0.05 to about 5 parts per hundred parts of PET, (i.e., from about 0.05 to about 5 phr). Most preferably, the amounts used for the two components of the composition fall within the range of from about 2 to about 8 parts of epoxidized plasticizer and from about 0.1 to about 3 parts of adjuvant per hundred parts of PET.

The epoxidized plasticizer described herein should have an oxirane oxygen content of about 0.5% to about 12.0% by weight. Preferably, the oxirane oxygen content is in the range of from about 3.0% to about 10.0%.

The epoxidized plasticizers may be prepared by techniques well known in the art by epoxidation, esterification and ester interchange. Typical techniques used in epoxidation, esterification and ester interchange reactions may be found for example in the chapters on "Epoxidation", "Esterification" and "Ester Interchange" in Kirk-Othmer, *Encyclopedia of Chemical Technology* (second ed. 1965), vol. 8, pp. 238 et seq, pp. 313 et seq, and pp. 356 et seq, respectively, incorporated herein by reference.

The "epoxy plasticizers" used pursuant to this invention represent epoxy oils and esters of the type used as plasticizer-stabilizers for poly(vinyl chloride) resins. While any type of epoxy plasticizer may be employed in the practice of the invention preferred types include the following:

(a) a hydrocarbyl ester of a mono epoxidized alkenoic acid, said ester being characterized by containing from about 12 to about 50 carbon atoms (preferably from about 16 to about 36 carbon atoms) in the molecule;

(b) an epoxidized unsaturated triglyceride containing at least one epoxide group; and (c) an epoxy ester mixture comprising at least one monoepoxy aliphatic monocarboxylic acid ester and at least one diepoxy aliphatic monocarboxylic acid ester in which each of the epoxy esters contains from about 7 to about 50 carbon atoms in the molecule.

Of the epoxy plasticizers of category (a) above, those having from about 16 to about 36 carbon atoms in the molecule are preferred for use in the compositions of this invention.

The alkenoic acids from which the category (a) epoxidized esters of this invention are derived are those having from about 7 to 36 carbon atoms and having the general formula:

wherein
R₁ is hydrogen or an alkyl radical,
R₂ is an alkylene radical, and
n is either 0 or 1. Exemplary of such mono unsaturated acids are dec-9-enoic acid, dodec-9-enoic acid, palmitoleic acid, oleic acid, petroselenic acid, vaccenic acid, gadoleic acid, 5-eicosenic acid, 5-docosenic acid, cetoleic acid, erucic acid, nervonic acid, 4-heptenoic acid, 3-methyl-7-octenoic acid, 4-methyl-3-hexenoic acid, 5-methyl-4-hexenoic acid, 3-ethyl-3-pentenoic acid, and 2-octenoic acid. Preferably, the alkenoic acid will have from about 14 to about 24 carbon atoms. Most preferred are the alkenoic acids, e.g., oleic acid, in which the single double bond is internally located, i.e., the double bond is at a non-terminal carbon atom.

The epoxidized alkenoic esters of category (a) may be alkyl, aryl, aralkyl, or cycloalkyl esters or mixtures thereof, with alkyl esters, in which the alkyl group has from about 7 to about 36 carbon atoms, being preferred. The most highly preferred alkyl esters are those in which the alkyl group contains from about 7 to about 12 carbon atoms. For example, the alkyl ester can be one in which the alkyl radical forming the alkyl group is methyl, ethyl, propyl, isopropyl, butyl, isobutyl, sec-butyl, t-butyl, pentyl, hexyl, octyl, decyl, dodecyl, 4-methyloctyl, 2-butyl-2-methylhexyl, eicosyl and the like. A most useful ester of this inention is one in which the alkyl group contains 8 carbon atoms, e.g., octyl mono epoxidized monobasic alkenoic acid.

Exemplary of the aryl esters are those in which the aryl radical is: phenyl; lower alkyl substituted phenyls, e.g., tolyl (o-, m- or p-isomers), ethylphenyl (o-, m- or p-isomers); dimethylphenyl (various isomers such as 2,4-; 2,5-; 3,4- etc. isomers); halogen substituted phenyl, e.g., chlorophenyl and bromophenyl; naphthyl; and alkyl or halogen substituted naphthyl such as 2-methyl-5-ethylnaphthyl, 2-propyl-4-methyl-6-chloronaphthyl, and 7-chloronaphthyl.

Production of the esters of this invention can be effected by esterification of the selected alkenoic acid followed by epoxidation of the resultant ester.

Epoxidized octyl oleate (which is also referred to as octyl epoxy stearate) having a 3.6% by weight minimum oxirane oxygen content can be purchased, for example, under the designation DRAPEX 3.2 from Argus Chemical Corporation, Brooklyn, N.Y. 11231.

The epoxidized unsaturated triglycerides of category (b) above are triglycerides of aliphatic monocarboxylic acid(s) in which each of the acid constituents usually contains from about 6 up to about 30 carbon atoms and in which at least one acid constituent is epoxidized. It will be understood that an acid constituent may have more than one epoxide group and that more than one acid constituent may be epoxidized. Examples of aliphatic monocarboxylic acids which may be present in the triglyceride ester include, but are not limited to, the following: oleic acid, linoleic acid, linolenic acid, stearic acid, palmitic acid, myristic acid, lauric acid, eleostearic acid, licanic acid, ricinoleic acid, palmitoleic acid, petroselenic acid, vaccenic acid, erucic acid, arachidic acid, tetracosanoic acid, rapric acid, caproic acid and the like. It will be understood of course that prior to epoxidation at least one of the acid groups will contain olefinic unsaturation serving as the site(s) of epoxidation.

The epoxidized unsaturated triglycerides of category (b) may be individual compounds or mixtures thereof. The mixtures of epoxidized unsaturated triglycerides should have an oxirane oxygen content fallirg in the range of about 0.5% to about 12.0% by weight. Preferably, the oxirane oxygen content is in the range of from about 3.0% to about 10.0%. Most preferably, the oxirane oxygen content is from about 7.0% to about 9.5%. The foregoing oxirane oxygen contents also apply to the individual compounds of category (b) when they are used as individual compounds rather than as mixtures.

Examples of unsaturated triglycerides of category (b) which may be epoxidized include, but are not limited to, the following: linseed oil, soybean oil, sunflower seed oil, safflower oil, hempseed oil, tung oil, oiticica oil, corn oil, sesame oil, cottonseed oil, castor oil, olive oil, peanut oil, rapeseed oil, coconut oil, babassu oil, palm oil and the like.

Compounding and processing conditions make it preferable to use epoxidized unsaturated triglycerides which are relatively non-volatile and easy to mix and to select those which have a molecular weight which is sufficiently high to provide these characteristics, for example, a molecular weight of about at least 400. Economic considerations make it convenient to use epoxidized unsaturated triglycerides with a molecular weight of about 400 to about 1000. However, it is deemed feasible to use higher molecular weight epoxidized unsaturated triglycerides—i.e., those having molecular weights greater than 1000.

Epoxidized unsaturated triglycerides obtained by epoxidation of vegetable fats and oils are especially preferred. Most preferred are epoxidized soybean oil and epoxidized linseed oil.

Epoxidized unsaturated triglycerides of category (b) can be made by techniques well known to those having ordinary skill in the art. Such suitable compounds may be made by epoxidizing unsaturated triglycerides including, but not limited to, linseed oil and soybean oil. The epoxidized compounds may be produced by introducing the epoxide linkage by treating the olefinic bonds with an epoxidizing agent, such as a peracid, e.g., peracetic acid, by well known techniques.

Epoxidized soybean oil having a 7.0% by weight minimum oxirane oxygen content can be purchased under the designation DRAPEX 6.8 and epoxidized linseed oil having a 9.3% by weight minimum oxirane oxygen content can be purchased under the designation DRAPEX 10.4 from Argus Chemical Corporation, Brooklyn, N.Y. 11231.

Epoxy ester mixtures of category (c) above comprising at least one monoepoxy aliphatic monocarboxylic acid ester and at least one diepoxy aliphatic monocarboxylic acid ester in which each of the epoxy esters contains from about 7 to about 50 carbon atoms in the molecule represent still another type of epoxidized plasticizer used pursuant to this invention.

By techniques well known in the art these epoxy ester mixtures can be derived from at least one alcohol having from one to about 20 carbon atoms and from at least two different aliphatic monocarboxlic acids having from about 6 to about 30 carbon atoms or from at least two different alcohols having from one to about 20 carbon atoms and from at least one aliphatic monocarboxylic acid having from about 6 to about 30 carbon atoms such that the epoxy ester mixture comprises at least one monoepoxy aliphatic monocarboxylic acid ester and at least one diepoxy aliphatic monocarboxylic acid ester in which each of the epoxy esters contains from about 7 to about 50 carbon atoms in the molecule. The epoxy ester mixture of category (c) can also be derived from vegetable fats or vegetable oils, the fatty acid fraction of tall oil and other aliphatic monocarboxylic acid esters (by ester interchange with one or more alcohols containing from one to about 20 carbon atoms). It is also deemed feasible to derive the epoxy ester mixture from nonfractionated tall oil—i.e., tall oil that contains its resin acid (rosin or rosin acid) and fatty acid fractions.

The alcohols of the category (c) epoxy ester mixtures have from one to about 20 carbon atoms and can be aliphatic, cyclic and aromatic. Exemplary of such alcohols are alkyl, alkenyl, aryl, cycloalkyl, aralkyl alcohols, and the like. Examples include, but are not limited to, the following: methanol, ethanol, propanol, butanol, pentanol, hexanol, heptanol, octanol, nonanol, decanol, undecanol, dodecanol, tridecanol, tetradecanol, pentadecanol, hexadecanol, heptadecanol, octadecanol, nonadecanol, 2-propene-1-ol (allyl alcohol), 2-buten-1-ol (crotyl alcohol), 1-penten-3-ol, trans-2-hexen-1-ol, 9-decen-1-ol, 10-undecen-1-ol (w-undecylenyl alcohol), cis-9-octadecen-1-ol (oleyl alcohol), cyclobutanol, cyclopentanol, cyclohexanol, cycloheptanol, cyclooctanol, cyclododecanol, cyclopropylmethylcarbinol, cyclopropylmethanol, cyclopentylpropanol, 1-cyclopentylethanol, cyclopentylmethanol, 4-cyclohexyl-1-butanol (cyclohexylbutanol), cyclohexylmethanol, cyclooctylmethanol, cycloundecylmethanol, phenol, naphthol, anthranol, benzyl alcohol, methylphenylcarbonol, dimethylphenylethylcarbinol (benzyl-tert- butanol) and the like.

The aliphatic monocarboxylic acids of the category (c) ester mixtures have from about 6 to about 30 carbon atoms. Examples include, but are not limited to, the following: oleic acid, linoleic acid, linolenic acid, stearic acid, palmitic acid, myristic acid, lauric acid, eleostearic acid, licanic acid, ricinoleic acid, palmitoleic acid, petroseleric acid, vaccenic acid, erucic acid, arachidic acid, tetracosanoic acid, capric acid, caproic acid and the like.

It will be understood of course that there will be sufficient olefinic unsaturation either in the alcohol portion or the acid portion so that epoxidation yields the monoepoxy and diepoxy compounds contained in the epoxy ester mixture of category (c).

Thus, for example, it is possible to prepare the following epoxy esters and to mix them to produce epoxy ester mixtures containing at least one monoepoxy aliphatic mono-carboxylic acid ester and at least one diepoxy aliphatic monocarboxylic acid ester: epoxidized octyl oleate, epoxidized octyl linoleate, epoxidized octyl linolenate, epoxidized octyl eleostearate, epoxidized octyl licanate, epoxidized octyl ricinoleate, epoxidized octyl palmitoleate, epoxidized octyl petroselenate, epoxidized octyl vaccenate, epoxidized octyl erucate, as well as the epoxidized methyl, ethyl, propyl, butyl, pentyl, hexyl, heptyl, nonyl, decyl, dodecyl, hexadecyl, octadecyl, allyl, crotyl, oleyl, cyclobutyl, cyclooctyl, naphthyl, anthryl or benzyl esters thereof and the like; and glycidyl stearate, glycidyl palmitate, glycidyl myristate, glycidyl laurate, glycidyl arachidate, glycidyl tetracosanate, glycidyl caprate, glycidyl caproate, as well as the epoxidized crotyl and oleyl esters thereof and the like.

Examples of vegetable fats and vegetable oils from which the epoxy ester mixture of category (c) may be derived include, but are not limited to, the following: coconut oil, babassu oil, palm oil, castor oil, olive oil, peanut oil, rapeseed oil, corn oil, sesame oil, cottonseed oil, soybean oil, sunflower seed oil, safflower oil, hempseed oil, linseed oil, tung oil, oiticica oil and the like.

Thus, for example, it is possible to prepare the methyl, ethyl, propyl, butyl, pentyl, benzyl, heptyl, octyl, nonyl, decyl, dodecyl, hexadecyl, octadecyl, allyl, crotyl, oleyl, cyclobutyl, cyclooctyl, naphthyl, anthryl or benzyl epoxy esters of coconut oil, babassu oil, palm oil, castor oil, olive oil, peanut oil, rapeseed oil, corn oil, sesame oil, cottonseed oil, soybean oil, sunflower oil, safflower oil, hempseed oil, linseed oil, turg oil, or oiticica oil and the like.

Mixtures comprising monoepoxy aliphatic monocarboxylic acid esters and diepoxy aliphatic monocarboxylic acid esters (category (c) above) are available commercially. For example, epoxidized esters of soybean oil acids and linseed oil acids are available from Viking Chemical Company, 838 Baker Building, Minneapolis, Minn. 55402, under the product designation VIKOFLEX. Such epoxidized esters are: methyl epoxy soyate (VIKOFLEX 7010), ethyl epoxy soyate (VIKOFLEX 7020), propyl epoxy soyate (VIKOFLEX 7030), butyl epoxy soyate (VIKOFLEX 7040), hexyl epoxy soyate (VIKOFLEX 7060), octyl epoxy soyate (VIKOFLEX 7080), methyl epoxy linseedate (VIKOFLEX 9010), ethyl epoxy linseedate (VIKOFLEX 9020), propyl epoxy linseedate (VIKOFLEX 9030), butyl epoxy linseedate (VIKOFLEX 9040), hexyl epoxy linseedate (VIKOFLEX 9060) and octyl epoxy linseedate (VIKOFLEX 9080).

An epoxy ester mixture of the fatty acid fraction of tall oil having a 5.0% by weight minimum oxirane oxygen content is commercially available from Argus Chemical Corporation, 633 Court Street, Brooklyn, N.Y. 11231 under the product designation DRAPEX 4.4, which is octyl epoxy tallate.

To date, tests with certain epoxidized plasticizers and a cooperative adjuvant in the compositions of this invention demonstrate that the adjuvant is synergistic. Thus, without the use of a synergistic adjuvant in conjunction with any of the above described hydrocarbyl esters of mono epoxidized alkenoic acids (category (a) above) there is no observed significant enhancement of PET moldability. Further, the use of the epoxidized unsaturated triglyceride (category (b) above), such as epoxidized soybean oil or epoxidized linseed oil, in combination with a synergistic adjuvant, such as sodium stearate, gives a significant enhancement of PET moldability. Likewise, the use of any of the hereinafter described synergistic adjuvants without these epoxidized plasticizers is without observable effect. In view of the ineffectiveness of these epoxidized plasticizers and adjuvants when used alone, it is surprising that their use in combination gives the very noticeable moldability enhancement.

Use of cooperative adjuvant in conjunction with the above described epoxy ester mixture (category (c) above) gives very noticeable moldability enhancement over compositions without the epoxy ester mixture.

Synergistic effect is noted for example by the use, as the adjuvant, of alkali metal salts of substantially saturated aliphatic monocarboxylic acids, such as sodium acetate, potassium acetate, sodium propionate, potassium propionate, sodium hexanoate, sodium octanoate, sodium decanoate, sodium laurate, potassium laurate, sodium tetradecanoate, sodium hexadecanoate, sodium stearate, and the like; and of alkali metal salts of unsaturated aliphatic monocarboxylic acids, such as sodium acrylate, potassium methacrylate, and the like. Also commercially available soaps, such as IVORY SOAP and IVORY SNOW (which are manufactured by The Procter and Gamble Company of Cincinnati, Oh., and IVORY SNOW and IVORY SOAP are believed to comprise sodium salts of tallow fatty acids and sodium salts of coconut fatty acids) are useful as synergistic adjuvants. The lithium, cesium and rubidium salts, while not as available and economical, should provide the synergistic effect sought. Of the foregoing salts, sodium stearate is most preferred.

Other effective synergistic adjuvants include sodium carbonate, talc, mica, boron nitride, SURLYN 1605 (an ionomer resin containing sodium ions and manufactured by E. I. du Pont de Nemours and Company), p-hydroxybenzoic acid, sodium benzoate, zinc stearate, alumina, calcium sulfate, sodium montanate, hydrophilic silica, potassium benzoate, calcium carbonate, antimony oxide, powdered copper, magnesium oxide, potassium bromide, barium sulfate and aluminum sulfate.

Without desiring to be bound by theoretical considerations, it is believed that materials which pursuant to this invention serve as adjuvants tend to be substances which are also effective nucleating agents. In accordance with this theory, it is contemplated that other substances which will prove to be effective adjuvants for use in this invention include metal salts of carboxylic acids such as zinc, lead, calcium, barium and cupric laurates and stearates; metal salts of inorganic acids such as silver nitrate and stannous chloride; highly polar organic compounds such as m-hydroxybenzoic acid, tetrachlorophthalic anhydride, inositol and phthalimide; sodium and potassium salts of organic polymers containing pendant carboxyl groups such as copolymers of olefins and acrylic or methacrylic acids and copolymers of aromatic olefins and maleic anhydride; and the like. Note in this connection French Pat. No. 2,129,162; British Pat. No. 2,015,013; and *The British Polymer Journal*, Volume 11, pages 146–150 (Sept. 1979).

Useful nucleating agents may also include the sodium or potassium salts of aliphatic dicarboxylic acids, such as, for example, oxalic acid, malonic acid, succinic acid, glutaric acid, adipic acid, pimelic acid, suberic acid, azelaic acid, sebacic acid, brassylic acid and the like; the sodium or potassium salts of unsaturated aliphatic dicarboxylic acids, such as, for example, maleic acid, fumaric acid, glutaconic acid and the like; the sodium or potassium salts of aliphatic tricarboxylic acids, such as, for example, tricarballyic acid, citric acid and the like; and the sodium or potassium salts of dimers or trimers of saturated or unsaturated carboxylic acids, such as, for example, dimers and trimers of $C_{18}$ fatty acids, such as, for example stearic acid.

Tests utilizing many of the known-in-the-art nucleating agents in the compositions of this invention demonstrate that these nucleating agents act synergistically to improve mold releasability of articles injection molded at relatively low temperatures (at least as low as 93° C). In view of these test results it is deemed that other art recognized nucleating agents will also perform synergistically in compositions of this invention to improve mold releasability of articles injection molded at relatively low temperatures (at least as low as 93° C.). Those skilled in the art need merely to perform a simple experiment to confirm if other art recognized nucleating agents are utilizable in the compositions of this invention.

To date tests performed using the epoxy ester mixtures of category (c) have not been extensive enough to prove that the cooperation exerted between the epoxy ester mixtures and the adjuvants is synergistic (i.e., all of the necessary baselines have not been run). However, inasmuch as synergistic cooperation was found to exist between many other combinations of this invention, it is contemplated and indeed expected that the combinations of the epoxy ester mixtures and the adjuvants will prove synergistic in actual practice.

To insure even dispersion of the epoxidized plasticizer and the adjuvant in the PET, it is preferred that the adjuvant and the epoxidized plasticizer, when either or both exist as a solid, be of a particle size so that at least 30% will pass through a 100 mesh U.S. Standard Sieve.

Highly preferred epoxidized plasticizer-adjuvant combinations are: the ester-adjuvant combination of epoxidized octyl oleate and sodium stearate; the epoxidized unsaturated triglyceride-adjuvant combinations of epoxidized soybean oil and sodium stearate and epoxidized linseed oil and sodium stearate; and the epoxy ester mixture-adjuvant combinations of the epoxy esters of soybean oil, of linseed oil or of the fatty acid fraction of tall oil and sodium stearate, combinations of octyl epoxy soyate (e.g., VIKOFLEX 7080), octyl epoxy linseedate (e.g., VIKOFLEX 9080) or octyl epoxy tallate (e.g., DRAPEX 4.4) and sodium stearate are more preferred.

To improve the injection moldability of polyethylene terephthalates any standard commercial grade or any heat stable grade of sodium stearate is utilizable in the compositions of this invention provided that the sodium stearate utilized is of a particle size so that at least 30% will pass through a 100 mesh, U.S. Standard Sieve. For example, such sodium stearate can be purchased as "Sodium Stearate T-1" or "Sodium Stearate, Heat-Stable" from Witco Chemical Corporation, Organic Division, New York, N.Y. 10017.

As mentioned previously, other additives may also be utilized in the composition of this invention. For example, it is most useful if the composition additionally contains a reinforcing filler. This filler, depending on its nature, can increase the strength and impact qualities of the PET composition. In fact, the use of a reinforcing filler is often required by most present day commercial usage of injection molded PET. In general, any reinforcement can be used, e.g., fibers, whiskers, or platelets of metals, e.g., aluminum, iron or nickel, and the like, and non-metals, e.g., ceramics, carbon filaments, silicates, asbestos, titanate whiskers, quartz, glass flakes and fibers, and the like. Although it is only necessary to have at least a reinforcing amount of the reinforcing filler present, in general, the filler will comprise from about 10 to about 160 parts per hundred of the unreinforced polyethylene terephthalate resin. Amounts of filler, especially glass fibers, in the range of from about 30 to about 140 parts per hundred of the unreinforced PET are preferred as such compositions have particularly desirable properties. From the standpoint of ease of injection molding usage, reinforced compositions of this invention, especially those using glass filers, preferably contain a filler constituent in an amount within the range of from about 30 to about 90 parts per hundred parts by weight of the unreinforced polyethylene terephtbate resin.

Of the various fillers that may be used in the compositions of this invention, the preferred reinforcing fillers are glass. It is most preferred to use fibrous glass filaments of lime-aluminum borosilicate glass that are relatively soda free. This is known as "E" glass. The length of the glass filaments and whether they are bundled into fibers and the fibers bundled in turn to roving, etc., is not critical to this invention. However, it has been found convenient to use glass strands of at least about ⅛ inch in length. It is to be understood that during compounding considerable fragmentation of the strands will occur and that even further reduction of length occurs in the final injection molded article.

Other additives may also be utilized in the composition of this invention to achieve certain desirable characteristics in the final injection molded product. For example, flame retardants may be added if the end use of the product requires the product to be possibly subjected to ignition sources. Flame-retarding additives which can be used for the compositions according to the invention comprise a large number of chemical compounds which are well known to those skilled in the art. In general, they contain chemical elements which are used because of their flar:e-retarding capacity, for example, bromine, chlorine, antimony, phosphorus and nitrogen. Preferably, the flame-retarding additives are bromine and/or chlorine containing organic compounds (optionally used together with auxiliary compounds, such as antimony trioxide, zinc borate, etc.) or eler:entary phosphorus or phosphorus compounds such as ammonium polyphosphate, various bromine and/or chlorine containing organic phosphate esters, hexaphenoxyphosphazene and the like.

To improve impact resistance, impact modifiers may be added to the composition of this invention. Exemplary of suitable impact modifiers are ethylene/vinyl acetate copolymers, ethylene/acrylic acid copolymers (having some of the acid functions neutralized), ethylene/methacrylic acid copolymers (having some of the methacrylic acid functions neutralized), ethylene-/alkyl acrylate/methacrylic acid terpolymer (also having some of the methacrylic acid functions neutralized), ABS, methyl methacrylate grafted polybutadiene, methyl methacrylate grafted poly(alkyl acrylates), methyl methacrylate styrene grafted rubbers, oxidized polyethylene, styrene-butadiene-styrene (S-B-S) block copolymers, styrene/butadiene multiblock copolymers, styrene/butadiene radial block copolymers, hydrogenated S-B-S block copolymers, styrene/butadiene rubber, terpolymers of ethylene, vinyl acetate and glycidyl methacrylate, copolymers of ethylene and glycidyl methacrylate, block copolymers of butadiene, styrene, and caprolactone, acrylic rubbers, EPDM, ethylene/acrylic acid copolymers, ethylene/methyl acrylate copolymers, ethylene/ethyl acrylate copolymers, polyester-ether multiblock copolymers such as copolymers of butylene glycol, polytetramethylene ether glycol and terephthalic acid, aliphatic esters such as poly(ethylene adipate), polycarbonate and the like. Amounts of impact modifiers generally fall within the range of from about 5 to about 25 parts per hundred parts of PET.

For protection against thermo-oxidative degradation, the customary amounts of stabilizers, preferably from about 0.001 to about 0.5 parts per hundred based upon the weight of the unstabilized composition, can be added to the compositions of this invention. Examples of suitable stabilizers are phenols and phenol derivatives, preferably sterically hindered phenols which contain alkyl substituents with 1-6 carbon atoms in both ortho positions to the phenolic hydroxyl groups, amines, preferably secondary arylamines and their derivatives, phosphates and phosphites, preferably the aryl derivatives thereof and quinones.

Non-limiting examples include
4,4'-bis(2,6-di-tert-butylphenol),
1,3,5-trimethyl-2,4,6-tris(3,5-di-tert-butyl-4-hydroxybenzyl)benzene,
4,4'-methylenebis(2,6-di-tert-butylphenol),
4,4'-butylidenebis(6-tert-butyl-m-cresol),
3,5-di-tert-butyl-4-hydroxybenzylphosphonic acid diethyl ester,
N,N'-bis($\beta$-naphthyl)-p-phenylenediamine,
N,N'-bis(1-methylheptyl)-p-phenylenediamine,
phenyl-$\beta$-naphthylamine,
4,4'-bis($\alpha,\alpha$-dimethylbenzyl)diphenylamine,
hydroquinone,
p-benzoquinone,
p-tert-butylpyrocatechol,
chloranil, and
naphthoquinone.

To the compositions of this invention there may be additionally added ultraviolet ray absorbents, lubricants, antistatic agents, colorizing agents (e.g., zinc sulfide), antifungal agents, foaming agents, etc. depending upon the ultimate use of the article injection molded.

The compositions of this invention can be prepared by blending the various components in a blender, e.g., a tumble blender or a Henschel mixer, compounding the mixture in an extruder, e.g., a twin-screw 28 mm Werner-Pfleiderer extruder, and thereafter chopping the extrudate into pellets. The resultant product is suitable for use in injection molding operations. It is noteworthy that the compositions of this invention can be satisfactorily injection molded at mold temperatures less than 100° C. with an acceptably short cycle time and with the molded article exhibiting physical properties which are commercially attractive or at least have commercial potential.

The present invention is further illustrated in the following examples, which are not to be construed as limiting.

EXAMPLES 1-29

Figure 1:
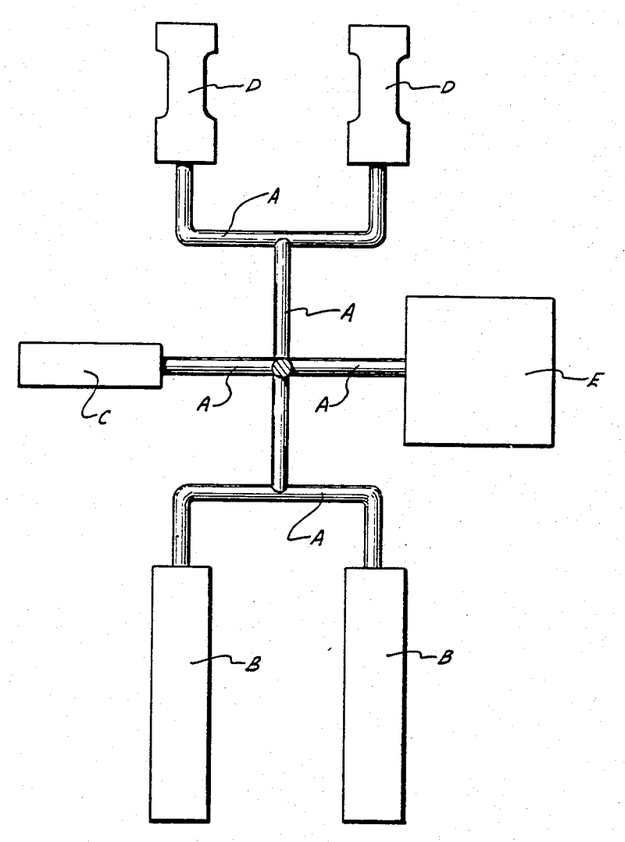

The various PET compositions of Examples 1-29 were prepared by mixing the components to form a premix, compounding the premix in a single screw extruder at temperatures of about 500° F. (260° C.), and molding the pellets into an article on a reciprocating screw injection molding machine. The injection mold was suitably shaped and dimensioned for providing an article having the configuration shown in the FIG.— which is a top plan view of the article. The mold utilized was a center gated mold having a nonmovable planar sprue side and a movable cavity side. As can be seen in the Figure the article formed by the mold has a plurality of runners, labeled "A", which terminate into various test pieces. Emanating from the center of the runner grid is a conventional tapered sprue. Two of the test pieces are rectangular bars and are labeled with the letter "B". These "B" bars are about six inches long, $\frac{1}{2}$ inch wide and $\frac{1}{4}$ inch thick. The test piece labeled "C" in the Figure is a rectangular bar which is $2\frac{1}{2}$ inches long, $\frac{1}{2}$ inch wide and 150 inch thick. The two "dog bone" shaped test pieces are labeled "D" and are used for the testing of tensile properties. They measure about $6\frac{1}{2}$ inches long, 150 inch thick and $\frac{3}{4}$ inch in width at each of their ends and $\frac{1}{2}$ inch in width at their middles. The test piece labeled "E" is 4 inches long, $2\frac{3}{4}$ inches wide and 150 inch thick. The runners and sprue are approximately 154 inch in cross sectional width. This configuration for the test article was chosen for its complexity and for its yield of test specimens which are used in accordance with well recognized standard tests. The complexity of the article configuration was also thought sufficient to give a good prediction of moldability performance of the composition when used to form typical commercial articles.

The PET, epoxidized plasticizer, glass and sodium stearate used in the Examples are identified as follows:
Polyethylene Terephthalate (PET): from Goodyear Tire and Rubber Company; Vituf 5900—crystalline PET having an intrinsic viscosity of 0.59 measured at 25° C. in solvent consisting of 60 percent by weight phenol and 40 percent by weight of tetrachloroethane;
Epoxidized Octyl Oleate (Octyl Epoxy Stearate): from Argus Chemical Corp. under the designation DRAPEX 3.2;
Glass Fiber Strands: from Owens-Corning Fiberglas, Corp., designated Owens-Corning Fiberglas 419AA (3/16 inch chopped strands) or PPG Industries, Inc.,
PPG 3540 Fiberglass (150 inch chopped strands); and
Sodium Stearate: such as that available from Witco Chemical Company.

Tables I, II, and III (Examples 1-8, 9-16 and 17-24 respectively) report the observations noted of the moldability of various compositions of this invention. The observation of compositions not utilizing the combination of epoxidized plasticizer and adjuvants of this invention are shown in Table IV (Comparative Examples 25-29). Where moldability is shown as "Excellent", the molded article freely fell from the mold upon mold opening. A rating of "Good" indicates that a majority of the molded articles fell freely from the cavity side of the mold. When less than a majority, but still a substantial number of articles fell freely, a rating of "Fair" was given. The "Poor" rating indicates that most of the injection molded articles had to be pulled from the cavity side of the mold but that no sticking to the sprue side of the mold was observed or that, even though the main portion of the article did not stick to the sprue side of the mold, the sprue portion of molded article stuck on the sprue side. A rating of "Non-Moldable" indicates that the article stuck to the sprue side of the mold and that the molding cycle had to be stopped so that the molded article could be removed from the mold by chiseling, prying, etc.

In all the Examples the mold temperature was kept around 200° F. (93° C.).

TABLE I

Compositions of This Invention and Their Moldability

| Composition | Examples | | | | | | | |
|---|---|---|---|---|---|---|---|---|
| | 1 | 2 | 3 | 4 | 5 | 6 | 7 | 8 |
| PET Resin, parts | 100 | 100 | 100 | 100 | 100 | 100 | 100 | 100 |
| Glass Fiber, phr* | 43 | 43 | 43 | 43 | 43 | 43 | 43 | 43 |
| Octyl Epoxy Stearate, phr* | 3.0 | 3.0 | 3.0 | 3.0 | 3.0 | 3.0 | 3.0 | 3.0 |
| Sodium Stearate, phr* | 0.5 | — | — | — | — | — | — | 0.3 |
| Sodium Carbonate, phr* | — | 0.5 | — | — | — | — | — | — |
| Sodium Acetate, phr* | — | — | 0.5 | — | — | — | — | — |
| Sodium Propionate, phr* | — | — | — | 0.5 | — | — | — | — |
| Sodium Acrylate, phr* | — | — | — | — | 0.5 | — | — | — |
| Sodium Methacrylate, phr* | — | — | — | — | — | 0.5 | — | — |
| IVORY SNOW$^a$, phr* | — | — | — | — | — | — | 0.5 | — |
| Talc, phr* | — | — | — | — | — | — | — | 1.0 |
| Moldability | Excellent | Excellent | Excellent | Good | Fair | Poor | Excellent | Excellent |

*Parts per 100 parts PET
$^a$Believed to be about 85% by weight sodium salts of tallow fatty acids and about 15% by weight sodium salts of coconut fatty acids.

TABLE II

Compositions of This Invention and Their Moldability

| Composition | Examples | | | | | | | |
|---|---|---|---|---|---|---|---|---|
| | 9 | 10 | 11 | 12 | 13 | 14 | 15 | 16 |
| PET Resin, parts | 100 | 100 | 100 | 100 | 100 | 100 | 100 | 100 |
| Glass Fiber, phr* | 43 | 43 | — | — | 43 | 43 | 43 | 43 |
| Octyl Epoxy Stearate, phr* | 3.0 | 7.2 | 3.0 | 3.0 | 3.0 | 3.0 | 3.0 | 3.0 |
| Sodium Stearate, phr* | 0.5 | — | 0.5 | 0.5 | — | — | — | — |
| Boron Nitride, phr* | — | — | — | — | 0.5 | — | — | — |
| SURLYN 1605, phr* | — | — | — | — | — | 0.5 | — | — |
| p-Hydroxybenzoic Acid, phr* | — | — | — | — | — | — | 0.5 | — |
| Sodium Benzoate, phr* | — | — | — | — | — | — | — | 0.5 |
| Titanium Dioxide, phr* | 1.0 | — | — | 0.3 | — | — | — | — |
| Talc, phr* | — | 1.4 | — | — | — | — | — | — |
| Moldability | Excellent | Excellent | Excellent | Excellent | Excellent | Excellent | Excellent | Excellent |

*Parts per 100 parts PET

TABLE III

Compositions of This Invention and Their Moldability

| Composition | Examples | | | | | | | |
|---|---|---|---|---|---|---|---|---|
| | 17 | 18 | 19 | 20 | 21 | 22 | 23 | 24 |
| PET Resin, parts | 100 | 100 | 100 | 100 | 100 | 100 | 100 | 100 |
| Glass Fiber, phr* | 43 | 43 | 21 | 43 | 43 | 43 | 43 | 43 |
| Octyl Epoxy Stearate, phr* | 3.0 | 3.0 | 3.0 | 3.0 | 3.0 | 3.0 | 5.7 | 5.7 |
| Zinc Stearate, phr* | 0.5 | — | — | — | — | — | — | — |
| Sodium Stearate, phr* | — | 0.5 | 0.5 | 0.5 | 0.5 | 0.5 | 0.7 | 0.7 |
| Zinc Sulfide, phr* (Colorant) | — | 2.0 | 2.0 | 2.0 | 2.0 | — | — | — |
| Titanium Dioxide, phr* (Colorant) | — | — | — | — | — | — | — | 0.7 |
| Moldability | Excellent | Excellent | Poor** | Excellent | Excellent | Excellent | Excellent | Excellent |

*Parts per 100 parts PET
**Variant rating of poor believed to be the result of compounding errors.

TABLE IV

Compositions Not of This Invention and Their Moldability

| Composition | Comparative Examples | | | | |
|---|---|---|---|---|---|
| | 25 | 26 | 27 | 28 | 29 |
| PET Resin, parts | 100 | 100 | 100 | 100 | 100 |
| Glass Fiber, phr* | — | — | 43 | 43 | 43 |
| Octyl Epoxy Stearate, phr* | — | — | — | — | 3.0 |
| Sodium Stearate, phr* | — | — | — | 0.5 | — |
| TiO$_2$, phr* | — | 0.3 | — | — | — |
| Moldability | Non-Moldable | Non-Moldable | Non-Moldable | Non-Moldable | Non-Moldable |

*Parts per 100 parts PET

As can be seen from Table IV the absence of either the epoxidized plasticizer or the synergistic adjuvant results in a non-moldable composition under the same molding conditions.

Comparable results were obtained with compositions corresponding to Examples 18–21 except that the PET utilized was American Enka's T-0740.

The data shown in Table V illustrate the good balance of physical properties exhibited by articles injection molded from compositions of this invention at mold temperatures of about 200° F. (93° C.). The test specimens were subjected to the following ASTM procedures:

Specific Gravity—D 792-66 (1975);
Tensile-Yield, Elongation and Tensile Elastic Modulus—D 638-77a;
Flexural Strength and Flexural Elastic Modulus—D 790-71 (1978);
Izod Impact for $\frac{1}{4}$-inch bar at 23° C.—D 256-78;
Heat Deflection Temperature—D 648-72 (1978);
Vicat Softening Point—D 1525-76; and
Rockwell Hardness—D 785-65 (1976).

TABLE V
Compositions of This Invention and Their Physical Properties

| | Examples | | | |
|---|---|---|---|---|
| | 18 | 19 | 20 | 21 |
| Composition | | | | |
| PET Resin (Vituf 5900) - parts | 100 | 100 | 100 | 100 |
| Glass Fiber, phr* | 43 | 43 | 43 | 43 |
| Octyl Epoxy Stearate, phr* | 3 | 3 | 3 | 3 |
| Sodium Stearate, phr* | 0.3 | 0.5 | 0.7 | 0.1 |
| Properties | | | | |
| Tensile Yield, psi | 18,939 | 14,780 | 16,070 | 20,100 |
| Tensile Elastic Modulus, $10^6$ psi | 1.30 | 1.31 | 1.40 | 1.24 |
| Elongation, % | <10 | <10 | <10 | <10 |
| Flexural Strength, psi | 30,510 | 29,840 | 29,530 | 31,900 |
| Flexural Elastic Modulus, $10^6$ psi | 1.37 | 1.31 | 1.40 | 1.36 |
| Izod Impact, $\frac{1}{4}$" bar, ft-lb/in. | 1.6 | 1.6 | 1.5 | 1.7 |
| Izod Impact, $\frac{1}{8}$" bar, ft-lb/in. | 1.7 | 1.8 | 1.6 | 1.9 |

TABLE V-continued
Compositions of This Invention and Their Physical Properties

| | Examples | | | |
|---|---|---|---|---|
| | 18 | 19 | 20 | 21 |
| Rockwell Hardness, R Scale | 122 | 122 | 122 | — |

*Parts per 100 parts PET

EXAMPLES 30–52

The various PET compositions of Examples 30–52 were prepared as set forth in Examples 1–29.

The PET, glass and sodium stearate used in these Examples are identified in Examples 1–29. The epoxidized plasticizers used in Examples 30–52 are identified as follows:

Epoxidized Soybean Oil: from Argus Chemical Corp. under the designation DRAPEX 6.8, which is an essentially fully epoxidized soybean oil containing 7 weight percent of oxirane oxygen; and
Epoxidized Linseed Oil: from Argus Chemical Corp. under the designation DRAPEX 10.4.

Tables VI and VII (Examples 30–38 and 39–45, respectively) report the observations noted of the moldability of various compositions of this invention. The observation of compositions not utilizing the combination of epoxidized plasticizer and adjuvants of this invention are shown in Table VIII (Comparative Examples 46–52 of which 51 and 52 correspond to Comparative Examples 28 and 27 respectively—see Table IV). The moldability ratings have the same definitions as those set forth in Examples 1–29.

In all of these Examples the mold temperature was kept around 200° F. (93° C.).

TABLE VI
Compositions of This Invention and Their Moldability

| | Examples | | | | | | | | |
|---|---|---|---|---|---|---|---|---|---|
| Composition | 30 | 31 | 32 | 33 | 34 | 35 | 36 | 37 | 38 |
| PET Resin, parts | 100 | 100 | 100 | 100 | 100 | 100 | 100 | 100 | 100 |
| Glass Fiber, phr* | 43 | 43 | 43 | 43 | 43 | 43 | 43 | 43 | 43 |
| DRAPEX 6.8, phr* | 6 | 6 | 3 | 4 | 5 | 6 | 8.6 | 5 | 5 |
| Talc, phr* | 2 | 1 | 1 | 1 | 1 | 1 | 1.4 | — | — |
| Mica, phr* | — | — | — | — | — | — | — | 1 | — |
| TiO$_2$, phr* | — | — | — | — | — | — | — | — | 1 |
| Moldability | Good | Excellent | Good | Good | Good | Good | Excellent | Fair** | Poor |

*Parts per 100 parts by weight of PET resin
**Amorphous skin

TABLE VII
Compositions of This Invention and Their Moldability

| | Examples | | | | | | |
|---|---|---|---|---|---|---|---|
| Composition | 39 | 40 | 41 | 42 | 43 | 44 | 45 |
| PET Resin, parts | 100 | 100 | 100 | 100 | 100 | 100 | 100 |
| Glass Fiber, phr* | 43 | 43 | 43 | 43 | 43 | 43 | 43 |
| DRAPEX 6.8, phr* | 3 | 3 | 3 | 3 | 4.3 | — | 3 |
| DRAPEX 10.4, phr* | — | — | — | — | — | 3 | — |
| Sodium Stearate, phr* | 0.5 | 0.5 | 0.5 | 0.5 | 0.7 | 0.5 | — |
| Sodium Methacrylate, phr* | — | — | — | — | — | — | 0.5 |
| Moldability | Excellent | Good | Good | Good | Excellent | Excellent | Poor |

*Parts per 100 parts by weight of PET resin

TABLE VIII
Compositions Not of This Invention and Their Moldability

| | Comparative Examples | | | | | | |
|---|---|---|---|---|---|---|---|
| Composition | 46 | 47 | 48 | 49 | 50 | 51 | 52 |
| PET Resin, parts | 100 | 100 | 100 | 100 | 100 | 100 | 100 |
| Glass Fiber, phr* | 43 | 43 | 43 | 43 | 43 | 43 | 43 |
| DRAPEX 6.8, phr* | 6 | 3.0 | 8.6 | — | — | — | — |

TABLE VIII-continued

| Compositions Not of This Invention and Their Moldability | | | | | | | |
|---|---|---|---|---|---|---|---|
| | Comparative Examples | | | | | | |
| Composition | 46 | 47 | 48 | 49 | 50 | 51 | 52 |
| Talc, phr* | — | — | — | 2 | 2.8 | — | — |
| Sodium Stearate, phr* | — | — | — | — | — | 0.5 | — |
| Moldability | Non-moldable | Non-moldable | Non-moldable | Non-moldable | Non-moldable | Non-moldable | Non-moldable |

*Parts per 100 parts of PET

As can be seen from Table VIII, the absence of either the epoxidized plasticizer or the synergistic adjuvant results in a non-moldable composition under the same molding conditions.

The data shown in Table IX illustrate the good balance of physical properties exhibited by articles injection molded from compositions of this invention at mold temperatures of about 200° F. (93° C.). The test specimens were subjected to the ASTM procedures set forth in Examples 1–29.

TABLE IX

| Compositions of This Invention and Their Physical Properties | | | | | |
|---|---|---|---|---|---|
| | Examples | | | | |
| | 36 | 39 | 41 | 42 | 43 |
| Composition | | | | | |
| PET Resin, parts | 100 | 100 | 100 | 100 | 100 |
| Glass Fiber, phr* | 43 | 43 | 43 | 43 | 43 |
| Drapex 6.8, phr* | 8.6 | 3 | 3 | 3 | 4.3 |
| Sodium Stearate, phr* | — | 0.5 | 0.5 | 0.5 | 0.7 |
| Talc, phr* | 1.4 | — | — | — | — |
| Properties | | | | | |
| Tensile Yield, psi | 15,900 | 18,800 | 18,600 | 18,500 | 18,800 |
| Tensile Elastic Modulus, $10^6$ psi | 1.38 | 1.32 | 1.42 | 1.38 | 1.32 |
| Elongation, % | — | 10.9 | 8.3 | 10 | — |
| Flexural Strength, psi | 26,400 | 32,200 | 30,000 | 30,400 | 32,200 |
| Flexural Elastic Modulus, $10^6$ psi | 1.29 | 1.44 | 1.33 | 1.41 | 1.44 |
| Izod Impact, ¼" bar, ft-lb/in. | 1.3 | 1.6 | 1.6 | 1.7 | 1.6 |
| Rockwell Hardness, R Scale | — | 119 | 121 | 120 | — |

*Parts per 100 parts PET

EXAMPLES 53–57

The various PET compositions of Examples 53–57 were prepared as set forth in Examples 1–29.

The PET and sodium stearate used in these Examples are identified in Examples 1–29. The epoxidized plasticizers and glass used in Examples 53–57 are identified as follows:

- Octyl Epoxy Soyate: from Viking Chemical Company under the product designation VIKOFLEX 7080;
- Octyl Epoxy Lindseedate: from Viking Chemical Company under the product designation VIKOFLEX 9080;
- Octyl Epoxy Tallate: from Argus Chemical Corp. under the product designation DRAPEX 4.4; and
- Glass Fiber Strands: from Owens-Corning Fiberglas, Corp., designated Owens-Corning Fiberglas 419AA (3/16 inch chopped strands).

Table X reports moldability of various compositions of this invention (Examples 53–55) and of compositions not of this invention (Comparative Examples 56 and 57 which correspond to Comparative Examples 28 and 27 respectively—see Table IV) in terms of observation and the "number of sticks" (i.e., the number of times the molding cycle had to be stopped and a molded specimen physically removed from the mold) in relation to the "number of shots" (i.e., the number of injections) that were made with the given PET composition. In severe cases, removal of a stuck part required prying or chiseling. Where the observation is shown as "Excellent", the molded article freely fell from the mold upon mold opening. A rating of "Non-Moldable" indicates that the article stuck to the sprue side of the mold and that the molding cycle had to be stopped so that the molded article could be removed from the mold by chiseling, prying, etc.

In all the Examples the mold temperature was kept around 200° F. (93° C.)

TABLE X

| Various PET Compositions and Their Moldability | | | | | |
|---|---|---|---|---|---|
| | Examples | | | Comparative Examples | |
| | 53 | 54 | 55 | 56 | 57 |
| Composition | | | | | |
| Polyethylene Terephthalate, parts | 100 | 100 | 100 | 100 | 100 |
| Glass Fiber, phr* | 43 | 43 | 43 | 43 | 43 |
| Octyl Epoxy Linseedate[a], phr* | 3.0 | — | — | — | — |
| Octyl Epoxy Soyate[b], phr* | — | 3.0 | — | — | — |
| Octyl Epoxy Tallate[c], phr* | — | — | 3.0 | — | — |
| Sodium Stearate, phr* | 0.5 | 0.5 | 0.5 | 0.5 | — |
| Zinc Sulfide[d], phr* | — | — | 2.0 | — | — |
| Moldability | | | | | |
| Observation | Excellent | Excellent | — | Non-moldable | Non-moldable |
| Number of Sticks/Number of Shots | 0/10** | 0/10** | 0/15 | 10/10 | 10/10 |

*Parts per 100 parts PET
**Estimate - number of shots were not recorded
Estimate - number of shots were not recorded; however, in each run the molded specimen had to be physically removed from the mold
[a]VIKOFLEX 9080 from Viking Chemical Company
[b]VIKOFLEX 7080 from Viking Chemical Company
[c]DRAPEX 4.4 from Argus Chemical Corporation
[d]Zinc Sulfide - colorizing agent As can be seen from Table X, comparative Examples 56 and 57, the absence of the epoxidized plasticizer or the absence of both the epoxidized plasticizer and the adjuvant results in a non-moldable composition under the same molding conditions.

The data shown in Table XI illustrate the good balance of physical properties exhibited by articles injection molded from compositions of this invention at mold temperatures of about 200° F. (93° C.). The test specimens were subjected to the ASTM procedures set forth in Examples 1–29.

TABLE XI

Compositions of This Invention and Their Physical Properties

| | Examples | | |
|---|---|---|---|
| | 53 | 54 | 55 |
| Composition | | | |
| Polyethylene Terephthalate, parts | 100 | 100 | 100 |
| Glass Fiber, phr* | 43 | 43 | 43 |
| Octyl Epoxy Linseedate[a], phr* | 3.0 | — | — |
| Octyl Epoxy Soyate[b], phr* | — | 3.0 | — |
| Octyl Epoxy Tallate[c], phr* | — | — | 3.0 |
| Sodium Stearate, phr* | 0.5 | 0.5 | 0.5 |
| Zinc Sulfide[d], phr* | — | — | 2.0 |
| Properties | | | |
| Specific Gravity | 1.583 | 1.587 | 1.578 |
| Tensile Yield, psi | 19,900 | 18,600 | 18,500 |
| Tensile Elastic Modulus, $10^3$ psi | 1,330 | 1,410 | 1,405 |
| Elongation at yield, % | 10 | 10 | — |
| Flexural Strength, psi | 32,000 | 28,500 | 27,700 |
| Flexural Elastic Modulus, $10^3$ psi | 1,440 | 1,421 | 1,360 |
| Izod Impact, ¼" bar, ft-lbs/in. | 1.9 | 2.0 | 1.4 |
| Izod Impact, ⅛" bar, ft-lbs/in. | 1.7 | 1.7 | — |
| Heat Deflection Temperature @ 264 psi, °C. | 239 | 241 | 237 |
| Heat Deflection Temperature @ 66 psi, °C. | 250 | 249 | — |
| Rockwell Hardness, R Scale | 123 | 123 | — |

*Parts per 100 parts PET
[a]VIKOFLEX 9080 from Viking Chemical Company
[b]VIKOFLEX 7080 from Viking Chemical Company
[c]DRAPEX 4.4 from Argus Chemical Corporation
[d]Zinc Sulfide - colorizing agent

EXAMPLES 56–68

The various PET compositions of Examples 56–68 were prepared as set forth in Examples 1–29.

The compositions of these Examples comprised:

polyethylene terephthalate: 100 parts Vituf 5901, from Goodyear Tire and Rubber Company, a crystalline PET having an intrinsic viscosity of 0.59 measured at 25° C. in solvent consisting of 60 percent by weight phenol and 40 percent by weight of tetrachloroethane; and Glass Fiber: 43 phr (parts per hundred parts PET); PPG 3540 (⅛ inch chopped strands) from PPG Industries, Inc.

The composition of these Examples additionally contained, where indicated in Table XII.

DRAPEX 3.2 (Octyl Epoxy Stearate): 3.0 phr, from Argus Chemical Corp.; and

Nucleating Agent: 0.5 phr

Table XII reports the moldability of various polyethylene terephthalate compositions with Example 56 being a comparative example. Moldability is reported as in Examples 53–57,—i.e., the "number of Sticks" in relation to the "number of shots"—and in terms of "Severity of Stick". "Severity of Stick" is given in terms of "None"; "Light"—i.e., the part is easily tapped out of the mold—; "Moderate"—i.e. an intermediate amount of force was required to remove the part from the mold—; "Severe"—i.e., the part had to be hammered out of the mold.

In all Examples the mold temperature was kept around 200° F. (93° C.).

TABLE XII

Moldability of PET Compositions with Different Nucleating Agents

| | | Moldability with DRAPEX 3.2 | | Moldability without DRAPEX 3.2 | |
|---|---|---|---|---|---|
| Example | Nucleating Agent | Number of Sticks/Shots | Severity of Stick | Number of Sticks/Shots | Severity of Stick |
| 56 | None | 10/10 | Severe | — | — |
| 57 | Alumina | 3/12 | Light | 8/8 | Severe |
| 58 | Calcium Sulfate | 0/12 | None | 20/20 | Severe |
| 59 | Sodium Montanate | 0/13 | None | 6/6 | Moderate |
| 60 | hydrophilic Silica | 4/8 | Light | 10/10 | Severe |
| 61 | Potassium Benzoate | 2/7 | Light | 7/7 | Severe |
| 62 | Calcium Carbonate | 3/8 | Light | 8/8 | Severe |
| 63 | Antimony Oxide | 4/7 | Light | 6/6 | Moderate |
| 64 | Powdered Copper | 5/10 | Light | 6/6 | Severe |
| 65 | Magnesium Oxide | 9/18 | Light | 7/8 | Severe |
| 66 | Potassium Bromide | 10/16 | Light | 7/7 | Severe |
| 67 | Barium Sulfate | 1/10 | Light | 6/6 | Severe |
| 68 | Aluminum Sulfate | 2/9 | Light | 9/10 | Moderate |

Example 56 shows that without a nucleating agent the composition is non-moldable. However, the moldability is dramatically improved, as shown by Examples 57–58, when the compositions contain a nucleating agent and DRAPEX 3.2. Thus, Examples 56–68 demonstrate that both a nucleating agent and DRAPEX 3.2 are needed to obtain the improved moldability which is provided by compositions of this invention.

We claim:

1. A thermoplastic composition which is injection-moldable at a relatively low mold temperature, said composition comprising an intimate admixture of:
   (a) a polyethylene terephthalate; and
   (b) an epoxidized unsaturated triglyceride containing at least one epoxide group and in which each of the acid constituents contains from about 6 to about 30 carbon atoms and in which at least one such acid constituent is epoxidized; and
   (c) a nucleating agent cooperative with the epoxidized unsaturated triglyceride of (b) to improve the releasability from the injection mold, of articles injection molded from said composition at mold temperatures of 93° C. or below.

2. The composition of claim 1 wherein said epoxidized triglyceride contains more than one epoxide group.

3. The composition of claim 1 wherein said epoxidized triglyceride is epoxidized linseed oil.

4. The composition of claim 1 wherein said epoxidized triglyceride is epoxidized soybean oil.

5. The composition of claim 1 wherein the nucleating agent is synergistically cooperative with the triglyceride.

6. The composition of claim 5 wherein the nucleating agent is a monocarboxylic acid salt, talc or mica.

7. The composition of claim 5 wherein said nucleating agent is a monocarboxylic acid salt.

8. The composition of claim 7 wherein said nucleating agent is sodium stearate and the triglyceride is epoxidized soybean oil or epoxidized linseed oil.

* * * * *

UNITED STATES PATENT AND TRADEMARK OFFICE
CERTIFICATE OF CORRECTION

PATENT NO. : 4,539,352

DATED : September 3, 1985

INVENTOR(S) : James Y. J. Chung, Et Al

It is certified that error appears in the above-identified patent and that said Letters Patent is hereby corrected as shown below:

Column 4, line 51, reads "inention" and should read -- invention --.

Column 5, line 25, reads "fallirg" and should read -- falling --.

Column 7, line 37, reads "turg" and should read -- tung --.

Column 7, line 65, reads "adJuvant" and should read -- adjuvant --.

Column 10, line 15, reads "coa:positions" and should read -- compositions --.

Column 10, line 21-22 reads "terephtbate" and should read -- terephthate --.

Column 10, line 46 reads "flar:e-retarding" and should read -- flame-retarding --.

Column 10, line 52 reads "eler:entary" and should read -- elementary --.

Column 11, line 16 reads "protectior" and should read -- protection --.

UNITED STATES PATENT AND TRADEMARK OFFICE
CERTIFICATE OF CORRECTION

PATENT NO. : 4,539,352

DATED : September 3, 1985

INVENTOR(S) : James Y. J. Chung, Et Al

It is certified that error appears in the above-identified patent and that said Letters Patent is hereby corrected as shown below:

Column 12, line 22 reads "150" and should read -- 1/8 --.

Column 12, line 25 reads "150" and should read -- 1/8 --.

Column 12, line 28 reads "150" and should read -- 1/8 --.

Column 12, line 29 reads "154" and should read -- 3/8 --.

Column 12, line 52 reads "150" and should read -- 1/8 --.

Column 17, line 16 reads "inJection" and should read -- injection --.

Column 20, line 25 reads "57-58" and should read -- 57-68 --.

Signed and Sealed this

Tenth Day of December 1985

[SEAL]

Attest:

DONALD J. QUIGG

Attesting Officer

Commissioner of Patents and Trademarks